UNITED STATES PATENT OFFICE.

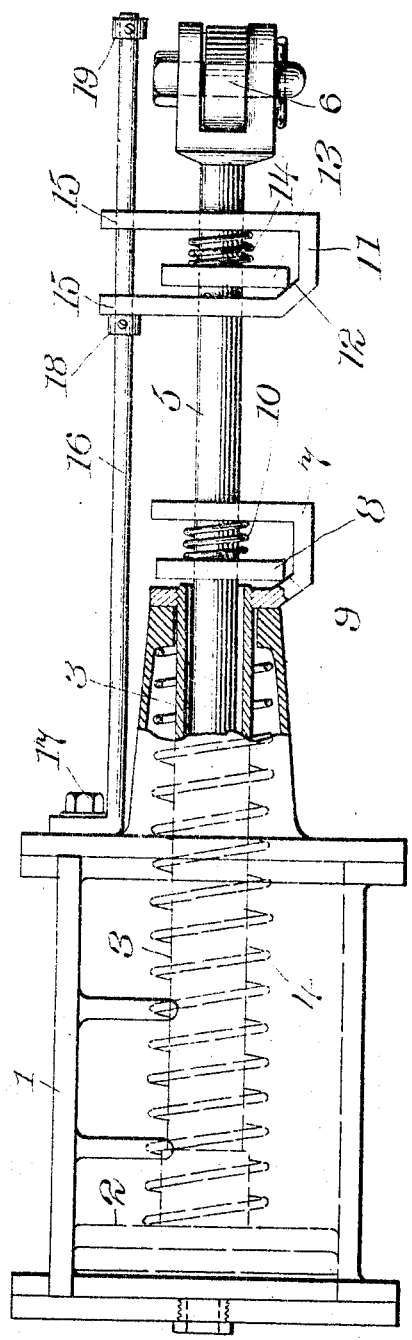

WILLIAM H. SAUVAGE, OF NEW YORK, N. Y., ASSIGNOR, BY MESNE ASSIGNMENTS, TO ATLAS SLACK ADJUSTER COMPANY, OF NEW YORK, N. Y., A CORPORATION OF NEW YORK.

SLACK-ADJUSTER.

No. 860,249.             Specification of Letters Patent.             Patented July 16, 1907.

Application filed November 21, 1906. Serial No. 344,436.

*To all whom it may concern:*

Be it known that I, WILLIAM H. SAUVAGE, a citizen of the United States of America, and a resident of the borough of Manhattan, city, county, and State of New York, have invented certain new and useful Improvements in Slack-Adjusters, of which the following is a specification.

My invention relates to automatic slack adjusting mechanism for railway brakes, and consists of a simple and economical form of slack adjuster for use on railway cars where kick springs are employed to insure the complete return of the brake mechanism to its initial position after each application of the braking force.

The best form of apparatus embodying my invention at present known to me is shown in the accompanying drawing wherein appear the representation of an ordinary air brake cylinder, piston and push rod with my invention applied thereto, certain parts being shown partly in section and the remainder in side elevation.

1 represents the ordinary brake cylinder in which is the piston 2 having the hollow piston rod 3 and the spring 4, which serves to return the piston to its initial position when brakes are released. In the hollow piston 3 is the ordinary push rod 5 which is pivoted at its outer end to one of the brake levers 6 in the usual way.

To apply my invention I screw or otherwise attach to the outer end of the hollow piston 3 the casting 7 which forms a clutch frame. This clutch frame is practically mounted upon push rod 5 as it is perforated for the passage of said push rod there through. Within the clutch frame is the perforated clutch dog 8 also mounted upon the push rod and having one end bearing against the beveled portion 9 of frame 7 as a fulcrum. A small spiral spring 10 is confined between the clutch dog 8 and the outer end of the frame 7 and serves to hold the clutch dog up against its fulcrum normally in gripping position. A second clutch frame 11 is also mounted loosely on the push rod and has a beveled portion 12 serving as a fulcrum for the clutch dog 13 which is held in operative position by the spring 14.

The upper ends of the clutch frame 11 are preferably perforated as at 15, 15, and through these perforations passes the fixed rod 16 which may be conveniently supported by being bolted to the cylinder head by one of the cylinder head bolts 17. On this rod 16 are the adjustable stops 18 and 19 which serve to limit the movement of the clutch frame 11 along said rod 16.

The operation of my invention is as follows: The parts being in the position shown in the drawing, the brake rigging is so adjusted as to permit the use of new brake shoes with a stroke of the piston and push rod just sufficient to bring the clutch frame 11 in contact with the stop 19 and give the piston the predetermined maximum amount of piston travel, say 6 inches. With this condition of the brake rigging and shoes the clutch frame 11 will vibrate back and forth between the two stops barely touching the stop 19 upon a full application of the brakes and barely touching the stop 18 on the release of the brakes and without changing its position upon the push rod 5. When through wear of the brake shoes or for other reasons the allowable piston travel is exceeded say by an inch, the frame 11 will strike stop 19 after the piston has traveled six inches and be held stationary thereby, while the push rod 5 moves through clutch dog 13 for a distance of an extra inch of excessive travel. On the release of the brake frame 11 will strike stop 18 when the piston 2 has returned to within an inch of its inmost position and further motion of the frame 11 be checked at that point. The clutch dog 13 will prevent further movement of the push rod to the left and the piston continuing its movement under the pressure of the spring 4 will cause the clutch dog 8 to travel along the push rod for a distance of an inch. This takes up the slack by an amount equal to the excess movement of the piston on the previous brake application and will hold the piston down to the predetermined maximum of travel until further wearing of the shoes causes the apparatus to take up slack again.

The advantages of my invention comprise its extreme simplicity and cheapness; the fact that all strains are transmitted in straight lines coincident with the axes of the various parts; the compactness of the construction; its ease of application to existing structures without changing the same further than the possible lengthening of the push rod; and the accuracy of the take up action.

It is evident of course that other forms of friction clutches and clutch frames might be used in place of those shown in drawing, and that other forms of adjustable stops could be employed.

Having, therefore, described my invention, I claim:

1. In a slack adjusting mechanism for railway brakes the combination of the cylinder, hollow piston and push rod, a friction clutch connecting the push rod with the hollow piston, permitting the drawing out of the push rod, but normally preventing its return, a second friction clutch mounted on the push rod and adapted to slide inwardly thereon, and a fixed stop limiting the motion of said second clutch in each direction within predetermined bounds.

2. In a slack adjusting mechanism for railway brakes the combination of the cylinder, hollow piston and push rod, a friction clutch connecting the push rod with the hollow piston, permitting the drawing out of the push rod, but normally preventing its return, a second friction clutch mounted on the push rod and adapted to slide inwardly thereon, and a fixed stop limiting the motion of said second clutch in each direction within predetermined bounds, said friction clutches each comprising a perforated clutch dog mounted on the push rod, a clutch frame surrounding the same and provided with a suitable fulcrum for the clutch dog and a spring holding the dog in operative position.

3. In a slack adjusting mechanism for railway brakes the combination of the cylinder, hollow piston and push rod, a gripping device mounted on the hollow piston and permitting the push rod to be drawn outwardly but normally preventing it from being forced inwardly, a second gripping device mounted loosely on the push rod and adapted to slide inwardly thereon, but not outwardly, and a stop for said gripping device comprising a rod bolted to the cylinder, passing through perforations in the gripping device and provided with projections engaging the outer sides of said gripping device.

Signed at New York, N. Y. this 19th day of November, 1906.

WILLIAM H. SAUVAGE.

Witnesses:
A. PARKER-SMITH,
M. G. CRAWFORD.